Jan. 24, 1956     E. J. LIME ET AL     2,732,098
HOT BEVERAGE VENDING MACHINE

Filed Feb. 9, 1952     4 Sheets-Sheet 1

INVENTOR.
Ermal J. Lime and
BY Charles S. Hedges.
Fishburn & Mullendore
ATTORNEYS.

Jan. 24, 1956

E. J. LIME ET AL 2,732,098

HOT BEVERAGE VENDING MACHINE

Filed Feb. 9, 1952

INVENTOR.
Ermal J. Lime and
BY Charles S. Hedges

Fishburn & Mullendore
ATTORNEYS.

Jan. 24, 1956  E. J. LIME ET AL  2,732,098
HOT BEVERAGE VENDING MACHINE
Filed Feb. 9, 1952  4 Sheets-Sheet 3
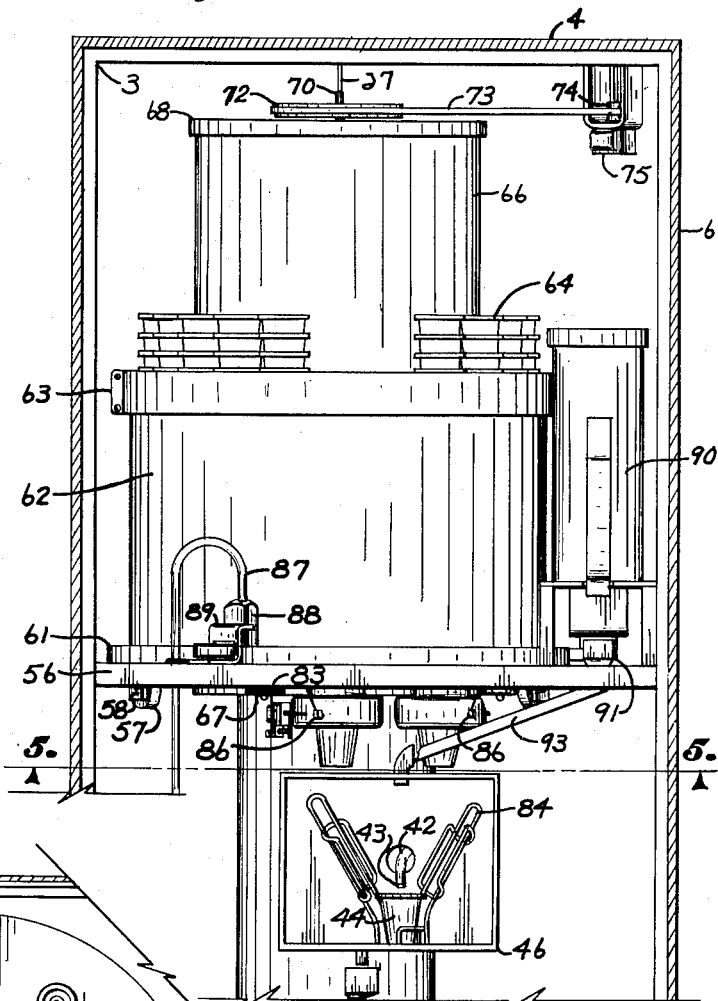
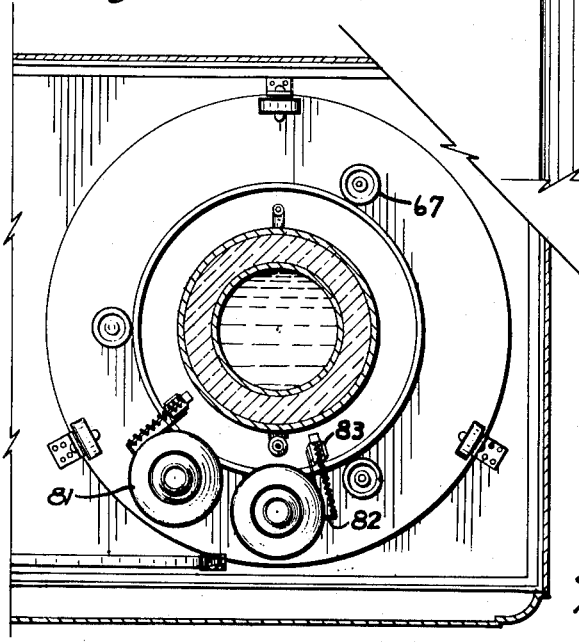
INVENTOR.
Ermal J. Lime and
BY Charles S. Hedges.
Fishburn & Mullendore
ATTORNEYS.

Jan. 24, 1956  E. J. LIME ET AL  2,732,098
HOT BEVERAGE VENDING MACHINE
Filed Feb. 9, 1952  4 Sheets-Sheet 4

INVENTOR.
Ermal J Lime and
BY Charles S. Hedges.
Fishburn & Mullendore
ATTORNEYS.

United States Patent Office 2,732,098
Patented Jan. 24, 1956

2,732,098

HOT BEVERAGE VENDING MACHINE

Ermal J. Lime and Charles S. Hedges, Kansas City, Mo., assignors to Crelo Manufacturing Company, Inc., Kansas City, Mo., a corporation of Missouri Application February 9, 1952, Serial No. 270,884

3 Claims. (Cl. 221—11)

This invention relates to hot beverage vending machines, and more particularly to apparatus for storing containers with bags of coffee or tea therein and delivering said containers with hot water for brewing hot beverage by the "steep" method.

The steeping method of making coffee consists in placing a measured quantity of freshly roasted and ground coffee beans in a receptacle, then adding a measured quantity of hot water and allowing the mixture to steep for several minutes. It is desirable in a machine vending hot beverages formed by the steep method that the water be dispensed at substantially the boiling temperature. It is also desirable that the machine have large cup capacity with relatively small outside dimensions, and that the machine be capable of operation in any location regardless of altitude for providing hot beverage mixtures. It is also desirable for the vendee to have some selection as to the character or mixture of the beverage and yet be assured of sanitary conditions in the machine at all times.

The objects of the present invention are to provide a hot beverage vending machine which will have the above desirable features; to provide such a vending machine with controls which assure safe, positive operation in dispensing hot beverages and operable to stop operation of the entire machine in the event of occurrence of improper operating conditions; to provide individual containers or cups with bags of ground roasted coffee or tea therein for forming the desired beverage by addition of hot water; to provide storage for a plurality of stacks of such individual containers operable to move such stacks of containers into dispensing position until the storage is emptied; to provide a plurality of container dispenser mechanisms each operating to dispense a container with beverage ingredients of different characteristics, said dispenser mechanisms being selectively operable; to provide a hot beverage vending machine which has storage of a plurality of individual containers, each having a bag of beverage ingredients therein, some of said containers having powdered cream, milk and ground coffee in the bags, selective controls in the machine for delivering containers having desired beverage ingredients therein to a hot water-receiving position and timed flow of hot water through a predetermined size opening to meter a desired quantity of water into the container, and selective mechanism for delivering cubes of sugar into said container of beverage; and to provide a hot beverage vending machine which is economical to manufacture, easy to service and safe, efficient and sanitary in operation to dispense desired hot beverages.

In accomplishing these and other objects of the present invention, we have provided improved details of structure, the preferred forms of which are illustrated in the accompanying drawings, wherein:

Fig. 4 is a vertical sectional view through the vending machine on the line 4—4, Fig. 3.

Fig. 5 is a horizontal sectional view through the vending machine on the line 5—5, Fig. 4.

Figure 1:
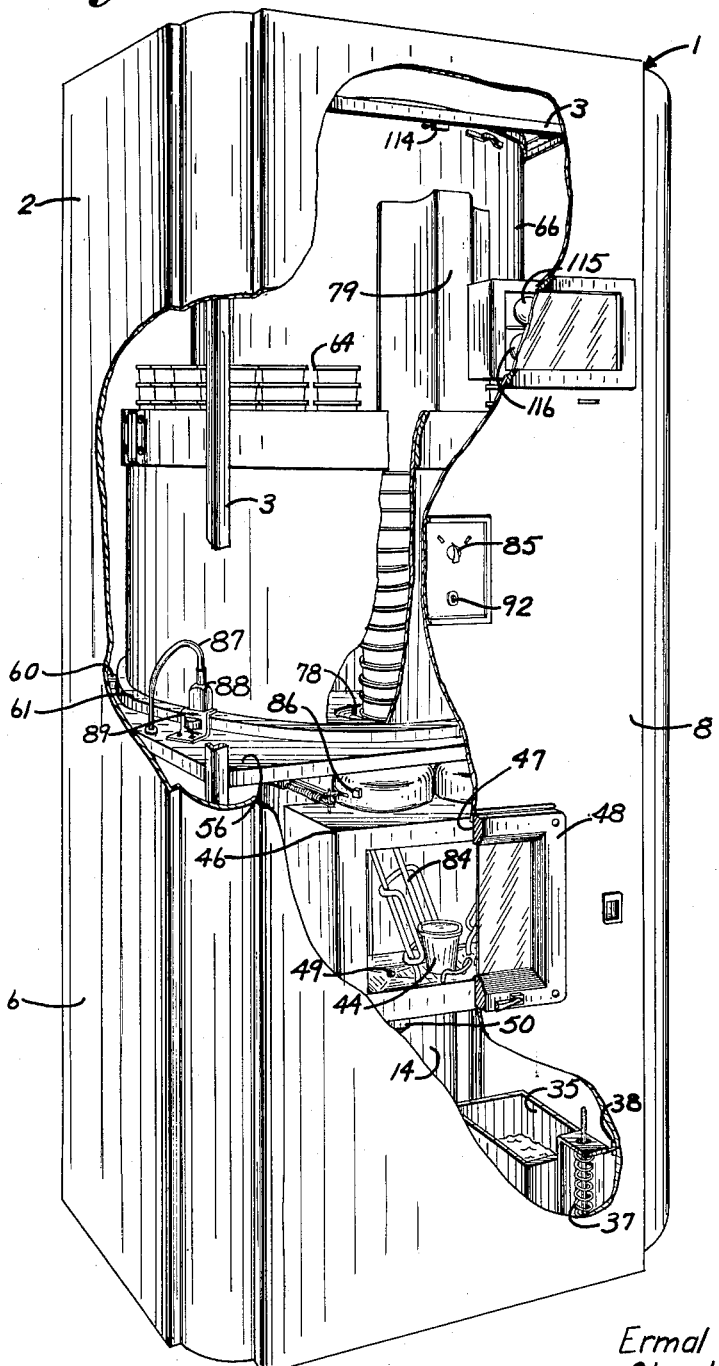
Fig. 1 is a perspective view of a hot beverage vending machine with portions of the case broken away to illustrate the arrangement of parts therein.

Referring more in detail to the drawings:

1 designates a hot beverage vending machine having a casing 2 preferably including a frame 3 on which is mounted a top wall 4, bottom wall 5, side walls 6, and rear wall 7, the front of the casing being closed by a removable panel or door 8 suitably mounted on said frame 3. A liquid heating apparatus 9 is substantially centrally located in the casing and preferably consists of a vertically arranged, elongated tank 10, having a bottom wall 11 and upwardly extending side walls 12. The tank is preferably circular in cross-sectional shape and has an open top 13. A shell 14 surrounds the tank in spaced relation to the walls thereof, with suitable insulation 15 filling the space between the walls of the tank and shell. A plurality of vertically spaced partitions 16 and 17 is secured to the interior of the tank wall 12 to form a compartmental or sectionalized structure having bottom, intermediate and top compartments 18, 19 and 20 respectively. Each partition is provided with an upwardly extending vent tube 21 having a passage extending vertically through the tube and partition to provide communication for the compartments above and below the partition. An aperture 22 is provided in each partition and valves 23 are arranged to seat on the upper surface of each partition to close said apertures, said valves being movable upwardly to open the apertures for restricted movement of water and water vapor from the next lower compartment. The partition 16 has a tube 24 extending downwardly therefrom to adjacent the bottom of the lower compartment 18 for flow of water from the intermediate compartment to the lower compartment.

A cover 25 is removably mounted on the upper end of the tank wall. A float 26 is arranged in the upper compartment 20 on the lower end of a rod 27 which loosely extends through an aperture 28 in said cover. The upper end of the rod 27 is suitably secured to a switch arm 29 of an electric switch structure 30, suitably mounted adjacent the top wall 4 in a position that elevation of the float 26 in response to raising of the liquid level in the tank will open the switch, and lowering the liquid level below a predetermined point will cause lowering of the float 26 and movement of the switch arm 29 in response thereto to complete an electric circuit to a solenoid valve 31 which controls the liquid supply to the tank.

The valve 31 is normally in closed position and opens in response to energization of the solenoid, said valve being arranged in an inlet pipe 32 which has communication with the upper compartment 20 intermediate the cover and desired level of water in said upper compartment, whereby the delivery of inlet water is above the liquid level and the inlet pipe 32 is connected to a suitable source of water supply. An overflow and vent tube 33 communicates with the upper compartment 20 intermediate the water inlet and cover 25. The tube 33 extends downwardly exteriorly of the shell 14 and terminates in an open end 34 for discharge in a safety overflow basin 35 arranged adjacent the bottom of the casing. The basin 35 has one end hingedly mounted as at 36 and the other end supported on a compression spring 37. The spring supported end of the basin is connected to a switch 38 arranged in such a manner that the spring normally supports the basin in such raised position that the switch is open. Accumulation of water or the like in the basin 35 will tend to swing the spring supported end of the basin downwardly, compressing said spring and a predetermined level of liquid in said basin will effect sufficient movement to open the switch 38 and interrupt the circuit to the vending machine, as later described. The vent tube 33 provides an overflow and maximum level of water in the tank 10 and also provides a vent whereby the upper compartment 20 is maintained substantially at atmospheric pressure. Water delivered to the tank through the inlet pipe 32 flows downwardly therein through the tube 21 and tube 24, completely filling the lower and intermediate compartments, the upper compartment being filled to a level determined by the float 26.

Heat is applied to the water in the lower compartment to raise the temperature of the water therein to approximately the boiling point. Heat is preferably applied by an electric immersion type heater 39 which extends upwardly from the bottom 11 of the tank for a substantial portion of the bottom compartment 18. The heating element is mounted in the bottom wall 11 with a watertight connection and insulated from the tank. The heating element is connected in a suitable electric circuit and is controlled by a thermostat 40 mounted on the upper portion of the water heating apparatus, for example on the cover 25, and having a heat responsive element 41 extending into the water in the upper compartment 20. The discharge of hot water from the heating apparatus 9 for use in making beverage is through a pipe 42 which communicates with the lower compartment 18 and terminates as at 43 over a beverage cup 44 which has been delivered to the hot water-receiving position as later described. The pipe 42 is provided with a solenoid type valve 45 which is normally in closed position. The energization of the solenoid opens the valve and permits flow of hot water therethrough. The discharge pipe 42 having a predetermined flow capacity and the head of liquid in the tank remaining substantially the same permit the amount of water dispensed into the cup 44 to be controlled by a suitable timer in the electric circuit whereby after the elapse of a predetermined time the solenoid is deenergized and the valve closed to stop flow of liquid through the pipe 42.

When a cup 44 is in hot water-receiving position it is in a dispensing housing 46 mounted on and extending inwardly from the front panel 8, said front panel being provided with an aperture 47 providing access to the cup, the aperture 47 normally being closed by a door 48 hingedly mounted on said panel 8. The bottom of the housing 46 slopes to a drain 49 whereby in the event of overflow or spilling of contents from the cup 44 the liquid will flow in the drain 49 and through a duct 50 to the basin 35.

In a hot beverage vending machine it is desirable to have a large capacity whereby a number of individual cups of beverage may be dispensed between servicing of the machine. In the present invention, the beverage is formed by the steep method and each cup, when it is delivered to the hot water-receiving position, has a bag 51 of beverage ingredients therein. In vending coffee from the machine, it is desirable that the vendee be able to select and receive black coffee alone, black coffee with sugar, coffee with cream, and coffee with cream and sugar. In order to provide such selection, some of the bags 51 will contain only ground roasted coffee and others will contain a mixture of ground roasted coffee, powdered cream and powdered sugar. A bag of the beverage ingredients is preferably placed in each individual cup and then the cup placed in a cup storage 52 in the vending machine.

Figure 2:
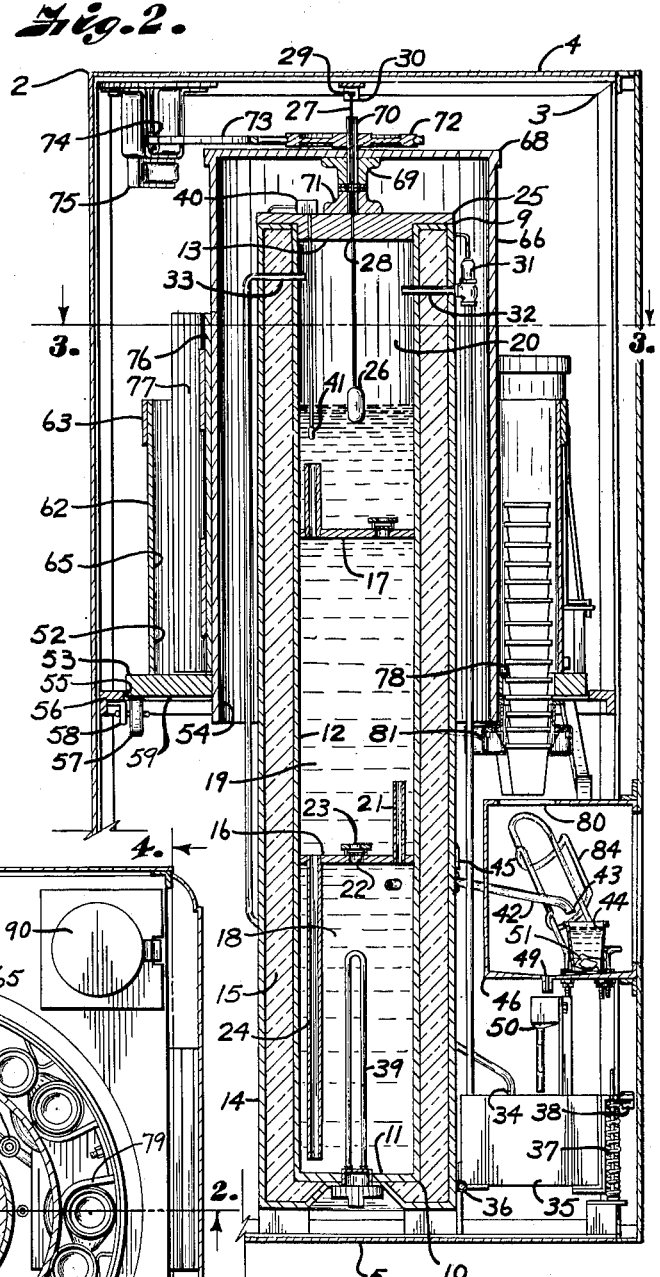
Fig. 2 is a vertical sectional view through the vending machine on the line 2—2, Fig. 3.
Figure 3:
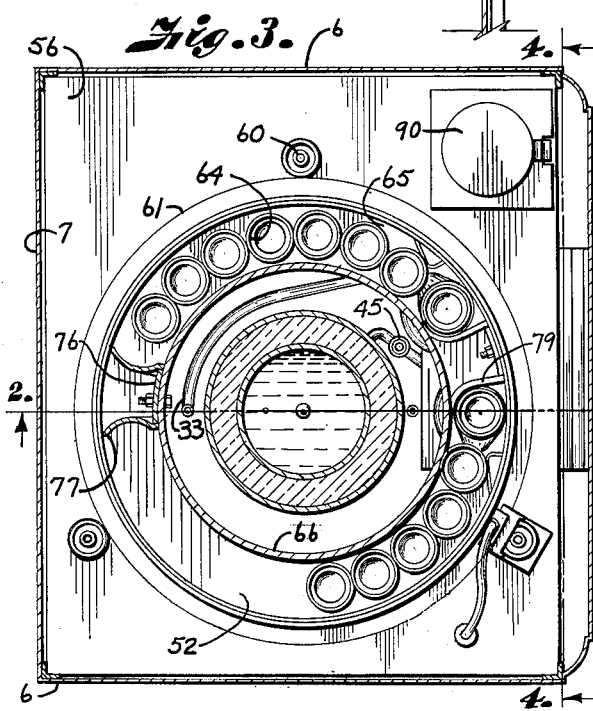
Fig. 3 is a horizontal sectional view through the vending machine on the line 3—3, Fig. 2.
Figure 6:
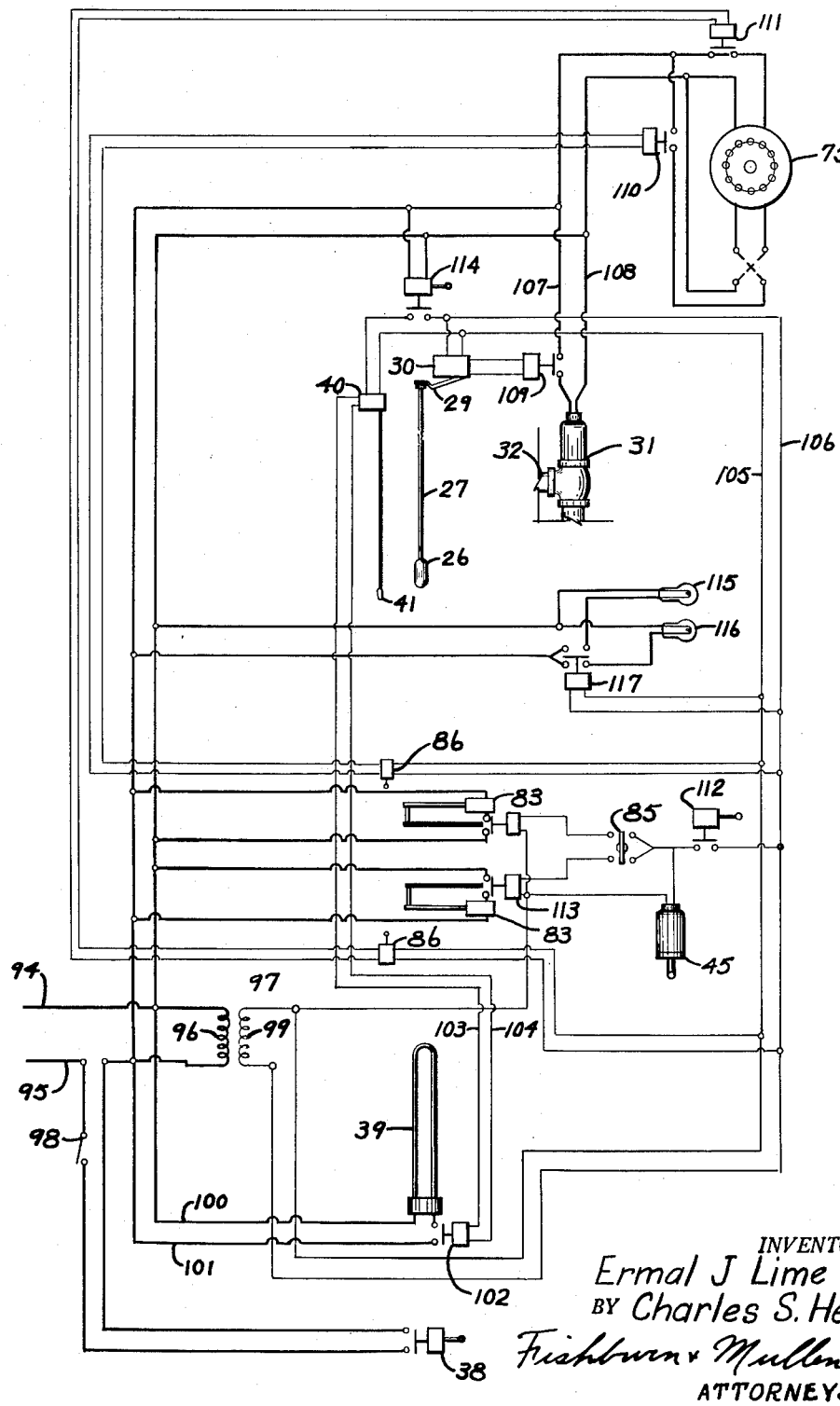
Fig. 6 is a diagrammatic view of the electrical circuits and controls of the vending machine.

The cup storage 52 consists of a ring member 53 surrounding the water heating apparatus 9, the edges 54 of the axial aperture in the ring member being spaced from the shell 14. The ring member 53 is supported for rotation in a cylindrical opening 55 of a partition 56 mounted in the casing 2 and spaced above the dispensing housing 46, as illustrated in Fig. 2. The ring member 53 is supported on a plurality of spaced rollers 57 carried on brackets 58 which are suitably mounted on the partition 56, whereby the rollers 57 engage the bottom surface 59 of the ring member 53 adjacent the peripheral edge thereof. Lateral shifting of the ring member is substantially eliminated by a plurality of spaced rollers 60 rotatable about vertical axes and arranged on the top of the partition 56 whereby the peripheries of said rollers engage the periphery 61 of the ring member 53. A cylindrical wall 62 is mounted on the ring member 53, in coaxial relation thereto, and extends upwardly therefrom in outwardly spaced relation to the edges 54 of the aperture in said ring member, the spacing between the edges of the aperture and the inner surface of the wall 62 being slightly more than the largest diameter of the cup 44. The wall 52 extends substantially above the ring member and the upper end of said wall is suitably reinforced as at 63. The wall 62 is of such height to support a substantial number of cups 44 in stacks 64 wherein the cups are nested one within the other with the lowermost cup in each stack resting on the upper surface of the ring 53 and the cup storage space 65 defined by the cylindrical wall 62 and an inner, coaxial, cylindrical shell 66 which is sleeved within and rotatably mounted in the aperture of the ring 53. The lower end of the shell 66 extends downwardly below the ring 53 with the periphery of said shell engaging with the peripheries of a plurality of spaced rollers 67 which are rotatably mounted on the bottom of the ring member 53 for rotation about vertical axes.

The shell 66 extends upwardly above the heating apparatus 9 and terminates in an end wall 68 which is provided with a bearing member 69, the bore of which is sleeved over a tube 70 fixed in and extending upwardly from a collar 71 secured on the tank cover 25 in such a manner that the float rod 27 extends through the bore of the tube 70. With this arrangement the bearing member 69 and shell 66 are rotatable around the sleeve 70 and the lower end of the shell 66 is maintained in axial alignment by the engagement of the rollers 67 therewith. A sheave wheel 72 surrounds the sleeve 70 and is fixed to the end wall 66, said sheave wheel being operatively connected by a belt 73 with a drive pulley 74 which is rotated by a motor 75 to effect rotation of the shell 66 when it is necessary to move a stack of cups from the cup storage to cup dispensing apparatus as later described.

A divider 76, having spaced, vertically arranged, arcuate flanges 77, is secured to the shell in the rear portion of the cup storage 65 to move the stacks of cups toward the front of the storage space when the shell 66 is rotated. In the forward portion of the storage space, spaced apertures 78 are arranged in the ring 53, said apertures being adjacent to and on opposite sides of inwardly directed, spaced separator flanges 79 arranged vertically in the storage space and secured to the cylindrical wall 62. The apertures 78 are of suitable size for passage of cups 44 therethrough, and are substantially vertically aligned with spaced openings 80 in the top of the dispensing housing 46.

Cup dispensing mechanism 81 is mounted on the bottom of the ring 53 under and in alignment with the respective openings 78, said dispensing mechanism 81 being such that when a stack 64 of cups 44 is moved into alignment with the respective apertures 78 and dropped therethrough, the lower cups will be engaged by the dispenser mechanism and be dispensed therethrough in response to actuation of said mechanism by levers 82 which are operated by solenoids 83, only one cup being dispensed by each actuation of the dispenser mechanism 81. The dispensed cup drops from the respective dispensing mechanism 81 through a respective opening 80 onto a suitable guide chute 84, which directs the cup to the hot water-receiving position.

In vending coffee a plurality of stacks of cups, having bags of ground roasted coffee in the respective cups, is placed in the storage space 65 on one side of the divider 77, and a plurality of stacks of cups having bags of coffee, powdered milk and powdered cream in the respective cups is placed on the other side of said divider. With this arrangement the divider 76 and separator 79 define separate portions of the storage space and one dispenser mechanism 81 will dispense cups for black coffee and the other dispenser mechanism will dispense cups for coffee with cream, a suitable switch 85 being provided in the electrical circuit whereby the vendee can select the type of coffee he desires by operating the switch 85 to control which solenoid 83 will be energized to actuate the respective cup dispensing mechanism. Switches 86 are arranged in each cup dispensing mechanism and in circuit with the reversible electric motor 75 whereby when the stack of cups in the respective dispensing mechanism is lowered to a predetermined minimum at which the top of said stack is below the ring 53, the respective switch will be closed to effect energization of the motor 75 to rotate the shell 66 in the direction necessary to engage the divider flange 77 with the stack of cups in the storage space to move another stack of cups into alignment with the respective aperture 78 whereby another stack of cups is dropped into the dispensing mechanism, one switch 86 energizing the motor 75 to rotate the shell 66 in one direction and the other switch 86 effecting energization of the motor 75 to rotate the shell 66 in the opposite direction. The dropping of a new stack of cups into the dispensing mechanism opens the respective switch 86 to stop operation of the motor 75.

The conductors for the solenoids 83, switches 86 and motor 75 are arranged in a conduit 87 with terminals in a plug member 88 on the end thereof, the terminals being arranged for connection with terminals in a socket in the ring 53 whereby it is necessary for the plug member and socket to be connected for operation of the apparatus, and when in connected position the plug member is engaged with a bracket 89 fixed to the partition 86 to lock the ring member against rotation. When it is desired to rotate the ring 53, as when servicing the machine, the plug 88 is removed from the socket and engagement with the bracket 89, freeing the ring 53 for rotation freely in either direction, whereby the cup storage may be rotated to position the respective portions thereof at the front of the machine to facilitate the placing of additional stacks of cups in the said storage, such access being provided by the removal of the front panel 8. When the supply of cups has been replenished the ring 53 is moved to align the socket with the bracket 89 for insertion of the plug 88, at which position the dispensing members 81 are in vertical alignment with the respective openings 80.

In order to permit the vendee to obtain coffee with or without sugar, the apparatus is arranged for delivering sugar to the cup 44, which is in hot water-receiving position. To accomplish this a sugar container 90 is mounted on the partition 56 and provided with a solenoid 91 which is energized by closing of a switch 92 to effect dispensing of a predetermined quantity of sugar from the container 90 and into a duct 93 for gravity flow into the cup 44.

In the electric circuit for energizing and controlling the various portions of the vending machine, leads 94 and 95 are connected to a suitable source of electric current. The leads 94 and 95 are connected to a primary winding 96 of a transformer 97, a master switch 98 and the switch 38 being arranged in one of the leads, for example lead 95, whereby opening of either of said switches will interrupt all electric current to the vending machine. When energized the primary winding 96 of the transformer 97 induces a low voltage current in a secondary winding 99 of the transformer for supply of such current to the control circuits. The heater 39 is connected by conductors 100 and 101 to the leads 94 and 95, in parallel circuit with the primary winding 96, a switch 102 being arranged in the conductor 101 for controlling supply of current to said heater. The switch 102 is of the solenoid type and is connected by conductors 103 and 104 to the thermostat 40 whereby the thermostat controls the application of heat to the water heater, said thermostat 40 being connected by conductors 105 and 106 to the terminals of the secondary winding 99. The solenoid valve 31 has conductors 107 and 108 which are connected in parallel circuit with the transformer primary winding 96, a solenoid switch or the like 109 being interposed in the conductor 107, said switch 109 being connected in parallel circuit with the thermostat 40 with the float switch 30 so arranged to control energization of the switch 109, thereby controlling the supply of water to the water heater tank 10.

The motor 75 is reversible and the respective windings thereof are connected in parallel circuit with the transformer primary winding 96, solenoid switches 110 and 111 being arranged to control energization of the respective windings of the motor 75. The switches 110 and 111 are connected into the control circuit with the switches 86 so arranged to control energization of the switches 110 and 111.

A suitable coin mechanism is arranged in the vending machine in such a manner that when a suitable coin is deposited, a coin-operated timer switch 112 is actuated to connect the selector switch 85 into the control circuit, the switch 85 being selectively operated to energize one or the other of solenoid switches 113 arranged to complete circuit to the respective cup dispensing mechanism solenoid 83, the solenoids 82 being arranged in parallel circuit with the primary winding 96. Also energized by the coin-operated timer switch 112 is a solenoid valve 45 to open same during the predetermined time the timer switch 112 is closed, thereby metering a quantity of hot water into the cup dispensed by the selected cup dispensing mechanism. A switch 114 is suitably arranged relative to the cup dispensing mechanisms whereby when one of said mechanisms is completely empty of cups, the switch will be actuated to break the circuit to the thermostat 40 to prevent further heating of the water in the hot water heating tank.

Suitable signal lights 115 and 116 are arranged in the casing to advise a prospective vendee the condition of the machine, an activating switch 117 being arranged in the circuit in such a manner that when the machine is capable of vending a hot beverage the light 116 will be energized, but when the machine is empty the light 115 is energized to warn the prospective vendee not to deposit a coin.

In operating a vending machine constructed and assembled as described, the basin 35 is emptied whereby the switch 38 is closed, and then the master switch 98 is closed to supply current to the various electrical apparatus. If the water in the water tank is low, the float 26 actuates the switch 30 to energize the switch 109 to close the circuit to the solenoid valve 31 for flow of water into the tank 10, until the desired quantity is in the tank as indicated by the float. The thermostat 40 will cause energization of the heating element 39 to heat the water in the tank 10 whereby the portion in the lower compartment 18 is at substantially boiling temperature, vapors from the water passing upwardly through the vent tubes 21 to the intermediate and upper compartments until the temperature in the upper compartment 20 corresponds to the setting of the thermostat, for example approximately 185 to 190° F. With the cups having bags of ingredients therein arranged in the storage and also in the cup dispensing mechanism, a vendee moves the switch 85 to select the character of beverage desired. Then a coin is placed in the coin mechanism, actuating the switch and timer 112 to complete the circuit to the respective switch 113, which in turn completes the circuit to the respective dispensing mechanism solenoid 83 to operate the lever and dispensing mechanism to drop a single cup through an opening 80 in the housing 43. The dropped cup is guided by a chute 84 to the water-receiving position. The solenoid valve 45 is also energized and opened for flow of hot water from the lower compartment 18 of the water tank 10 through the pipe 42 for discharge into the cup. The opening of the valve 45 is a slightly delayed action to provide sufficient time for the cup to drop into position. The timer switch 112 allows the solenoid valve 45 to be opened only sufficiently for a predetermined quantity of water to flow into the cup. If the vendee desires sugar, the switch 92 is actuated to effect delivery of cubes of sugar through the duct 93 to the cup. The vendee then opens the door 48 and removes the cup, which is then allowed to set until the coffee is steeped to a desired strength, at which time the bag of ingredients may be removed and the coffee beverage consumed.

This operation is repeated each time a coin is inserted and when a stack of cups aligned with the dispensing mechanisms is lowered to a predetermined minimum, which is below the ring 53, the respective switch 86 is actuated to energize one of the switches 110 and 111 to energize the reversible motor 75, which operates to turn the cylindrical shell 66 and flanges 77 thereon in a direction to move the stacks of cups in the storage until another stack of cups is positioned in alignment with the opening 78 to drop therethrough into nested relation with the remaining cups in the dispensing mechanism. When the new stack of cups is dropped into the dispensing mechanism, the respective switch 86 is actuated to break the circuit to the motor 75. The vending of hot beverages may continue to give the vendee desired selection of such beverage, however, when the supply of cups on one side of the storage is exhausted the switches 114 and 117 are actuated to stop the heating of the water and advise the prospective vendee that the machine should not be operated, as the vendee would no longer have a selection of the character of beverage to be obtained.

While we have, in the present instance, shown and described the preferred embodiment of the construction of hot beverage vending machine which has been found in practice to give satisfactory and reliable results, it is to be understood that we do not restrict ourselves to the details, as the same are susceptible of modification in various particulars without departing from the spirit or scope of the invention.

What we claim and desire to secure by Letters Patent is:

1. A cup storage and dispensing mechanism for use in hot beverage vending machines comprising, a cylindrical wall, a circular member having a bottom and a wall spaced from the cylindrical wall for defining a space therebetween adapted to contain a plurality of stacks of nested beverage cups, said bottom having spaced apertures therein for passage of stacks of cups, a vertically arranged partition fixed in the space between the cylindrical wall of the circular member substantially at the adjacent edges of said apertures, cup dispensing mechanism under and aligned with each aperture for receiving and supporting stacks of cups moved through the respective apertures in the bottom of the circular member, each cup dispenser mechanism being individually operable to drop one cup at a time, means rotatable in the space between the cylindrical wall and the wall of the circular member and having portions engageable with the stacks of cups remote from the apertures, means responsive to a predetermined minimum in the stack of cups supported by one cup dispensing mechanism for effecting rotation of the rotatable means to move the stacks of cups toward the respective aperture for said one dispensing mechanism for aligning and dropping a stack therethrough into nested relation with the cups remaining in said one dispensing mechanism, and means responsive to a predetermined minimum in the stack of cups supported by the other cup dispensing mechanism for effecting rotation of the rotatable means to move the stack of cups toward the respective aperture for said other dispensing mechanism for aligning and dropping a stack therethrough into nested relation with the cups remaining in said other cup dispensing mechanism.

2. A cup storage and dispensing mechanism for use in a hot beverage vending machine comprising, a support, a ring member, means on the support and engaging the ring member for rotatably carrying same for rotation about a vertical axis, a vertically arranged cylindrical wall on the ring member defining the exterior of the cup storage, means connecting the ring member and support for locking the ring member against rotation, a cylindrical shell rotatably supported in the ring member, said shell defining the interior of the cup storage, a pair of spaced apertures in the ring member for passage of stacks of cups therethrough, means on the vertical cylindrical wall between the apertures and extending toward the shell at the adjacent edges of the apertures for separating same, a vertically arranged flange on the shell remotely from said apertures, means rotating said shell for moving the flange into engagement with stacks of cups in the cup storage and moving said stacks of cups toward the respective apertures for aligning and dropping the stack of cups therethrough, cup dispensing mechanism supported on the ring member under and in alignment with each aperture for receiving stacks of cups dropped through said apertures, each cup dispensing mechanism being individually operable to drop one cup at a time therefrom, means responsive to a predetermined minimum of cups in the stack of cups supported by one cup dispensing mechanism for effecting operation of the shell rotating means to rotate said shell in a direction for moving said stack of cups toward and dropping same through the respective aperture to said one cup dispensing mechanism, and means responsive to a predetermined minimum of cups in the stack of cups supported by the other cup dispensing mechanism for effecting operation of the shell rotating means to rotate said shell in a direction for moving the stack of cups toward and dropping same through the respective aperture to said other cup dispensing mechanism.

3. A cup storage and dispensing mechanism for use in a hot beverage vending machine comprising, a support, a ring member, a plurality of rollers on the support and engaging the ring member for rotatably carrying same for rotation about a vertical axis, a vertically arranged cylindrical wall on the ring member defining the exterior of a circular storage space for stacks of cups, a cylindrical shell rotatably supported in the ring member, said shell defining the interior of the circular storage space for stacks of cups, a pair of spaced apertures in the ring member for passage of the stacks of cups therethrough, vertically arranged partitions on the vertical cylindrical wall between the apertures, said partitions extending from the vertical cylindrical wall toward the shell at the adjacent edges of the apertures for separating same, a vertically arranged flange on the shell remotely from said apertures, a reversible motor and electric circuit therefor for rotating said shell for moving the flange into engagement with stacks of cups in the cup storage and moving said stacks of cups toward the respective apertures for aligning and dropping the stack of cups therethrough, separable means in the shell rotating motor circuit engaging the ring member and support for locking the ring member against rotation whereby the motor circuit is interrupted when the ring member is rotatable, cup dispensing mechanism supported on the ring member under and in alignment with each aperture for receiving stacks of cups dropped through said apertures, each cup dispensing mechanism being individually operable to drop one cup at a time therefrom, means responsive to a predetermined minimum of cups in the stack of cups supported by one cup dispensing mechanism for energizing the shell rotating motor circuit to rotate said shell in a direction for moving said stack of cups toward and dropping same through the respective aperture to said one cup dispensing mechanism, and means responsive to a predetermined minimum of cups in the stack of cups supported by the other cup dispensing mechanism for energizing the shell rotating motor circuit to rotate said shell in a direction for moving the stack of cups toward and dropping same through the respective aperture to said other cup dispensing mechanism.

References Cited in the file of this patent

UNITED STATES PATENTS

| Number | Name | Date |
|---|---|---|
| 1,709,168 | Epperson | Apr. 16, 1929 |
| 1,881,894 | Olsen | Oct. 11, 1932 |
| 2,233,690 | Williamson | Mar. 4, 1941 |
| 2,394,262 | Reifsnyder | Feb. 5, 1946 |
| 2,493,212 | Zimmerman | Jan. 3, 1950 |
| 2,542,067 | Waite | Feb. 20, 1951 |
| 2,552,856 | Knapp | May 15, 1951 |
| 2,559,063 | Bremer | July 3, 1951 |
| 2,569,486 | Mills | Oct. 2, 1951 |
| 2,627,369 | St. Laurence | Feb. 3, 1953 |
| 2,639,207 | Ziska | May 19, 1953 |